United States Patent [19]

Brouwers

[11] Patent Number: 4,992,794
[45] Date of Patent: Feb. 12, 1991

[54] TRANSPONDER AND METHOD FOR THE PRODUCTION THEREOF

[75] Inventor: Arnoldus M. Brouwers, Wierden, Netherlands

[73] Assignee: Texas Instruments Incorporated, Dallas, Tex.

[21] Appl. No.: 419,043

[22] Filed: Oct. 10, 1989

[51] Int. Cl.$^5$ .............................................. G01S 9/02
[52] U.S. Cl. ................................. 342/51; 340/573; 119/1
[58] Field of Search ................. 342/51; 340/572, 573, 340/825; 119/1, 51.02; 128/653, 654

[56] References Cited

U.S. PATENT DOCUMENTS

| | | | |
|---|---|---|---|
| 3,144,017 | 8/1964 | Muth | 128/2.1 |
| 3,297,020 | 1/1967 | Mathiesen | 119/1 |
| 3,453,546 | 7/1969 | Fryer | 325/143 |
| 3,541,995 | 11/1970 | Fathauer | 119/51 |
| 3,964,024 | 6/1976 | Hutton et al. | 340/152 |
| 4,028,687 | 6/1977 | Hamaguchi et al. | 340/573 X |
| 4,065,753 | 12/1977 | Paul, Jr. | 340/152 |
| 4,129,855 | 12/1978 | Rodrian | 340/152 |
| 4,262,632 | 4/1981 | Hanton et al. | 119/51.02 X |
| 4,654,641 | 3/1987 | Ferguson et al. | 340/572 |
| 4,854,328 | 8/1989 | Pollock | 119/1 X |

FOREIGN PATENT DOCUMENTS

| | | |
|---|---|---|
| 0132102 | 1/1985 | European Pat. Off. . |
| 2604601 | 3/1988 | France . |
| 84/1688 | 5/1984 | PCT Int'l Appl. . |
| 85/04551 | 10/1985 | PCT Int'l Appl. . |
| 87/04900 | 8/1987 | PCT Int'l Appl. . |
| 2188028 | 9/1987 | United Kingdom . |

Primary Examiner—Thomas H. Tarcza
Assistant Examiner—Mark Hellner
Attorney, Agent, or Firm—James C. Kesterson; James T. Comfort; Melvin Sharp

[57] ABSTRACT

An implantable transponder has a plastic holder having a hollow interior and preferably a rough outer surface, a transmit/receive unit within the hollow interior of the holder, and an electronic element electrically connected to said transmit/receive unit within the hollow interior of said holder. The transmit/receive unit includes a core and coil assembly which may be impregnated with wax, and the hollow interior of the holder is at least partially filled with a plastic filler material such as polysiloxane.

12 Claims, 2 Drawing Sheets

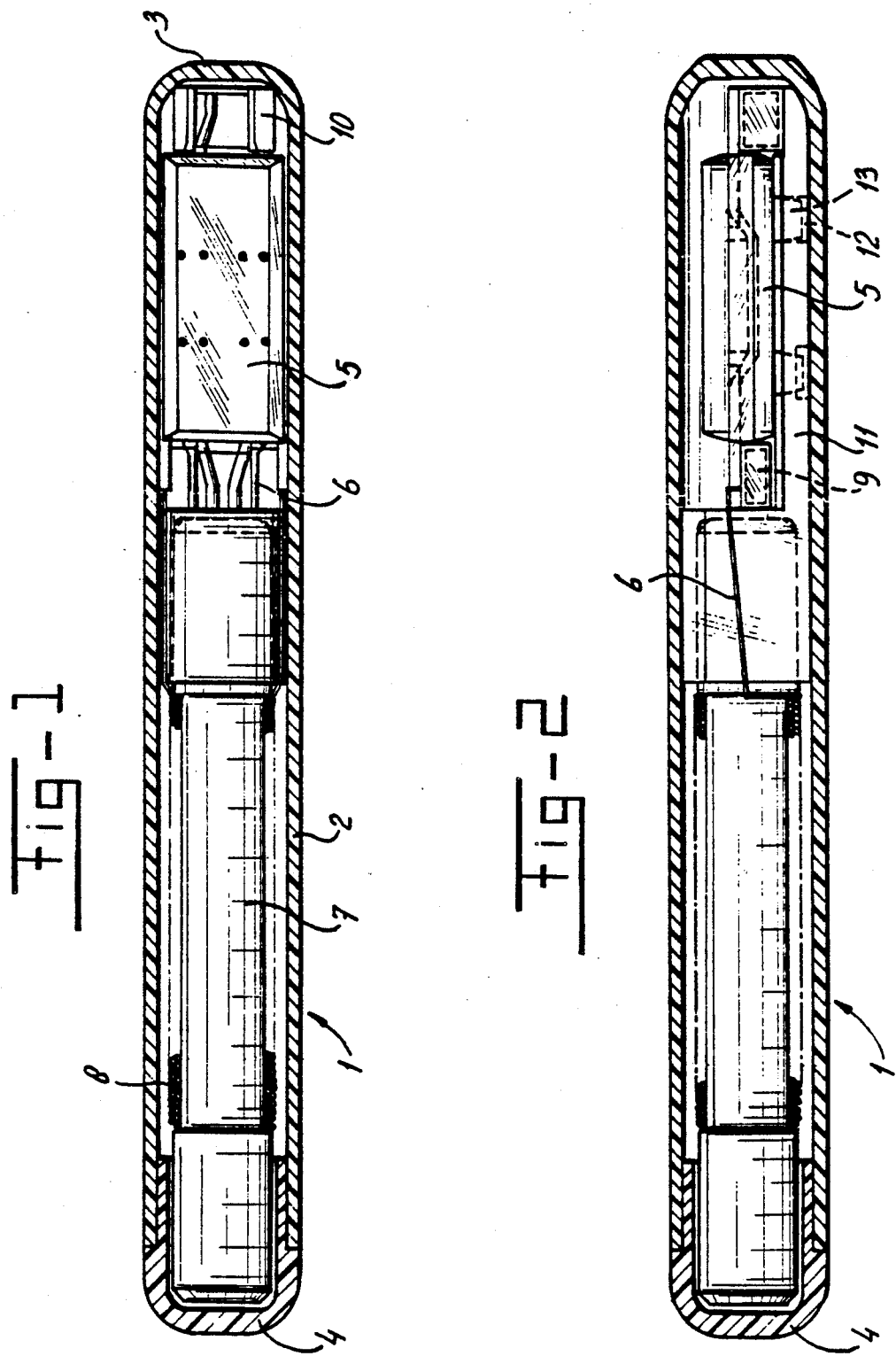

TRANSPONDER AND METHOD FOR THE PRODUCTION THEREOF

The present invention relates to a transponder to be implanted in an animal, comprising a holder containing an electrical element and a transmit/receive unit. Such a transponder is generally known in the state of the art, and the holder is made of glass in order to permit easy sterilization and simple implantation. It has, however, been found that such transponders "drift" in the body of the animal during its development. Besides, glass is made up of metal oxides, which means that tissue reaction always takes place, and this can cause rejection which promotes shifting of the transponder. Moreover, the tissue does not adhere to the glass, and this promotes the above-mentioned phenomenon.

The object of the present invention is to avoid this disadvantage.

This object is achieved in a transponder of the type described above in that the holder is essentially of plastic material on the outside. It was surprisingly found that, due to its different nature, plastic material adheres to the tissue of the animal, as a result of which "drifting" is largely avoided.

According to a preferred embodiment of the transponder, the plastic material is thermoplastic polyester. In order to avoid problems with sterilizing, in an advantageous embodiment the holder is made by injection molding. In this case such as a quality is immediately obtained that further sterilization is not necessary. The use of plastic does, however, have the disadvantage that the absorption of moisture is not ruled out to the same extent as with the use of glass. In order to avoid the adverse consequences of this on the electrical contents of the transponder, the space between the holder and the electrical parts is according to the invention at least partially filled with a plastic material such as polysiloxane material. In order to make this polysiloxane material penetrate well at all points, the holder is preferably filled at reduced pressure. In order to ensure better adhesion to the organism in which the transponder is to be implanted, the holder is provided with a certain surface roughness on the outside. If the transmit/receive unit has a ferrite core surrounded by windings, it can be protected by impregnation with wax. Since in practice the length of the transponder is less important than its diameter, a particularly advantageous arrangement is obtained if the axis of the transmit/receive unit essentially coincides with the axis of the electrical element. This means that no special dimension need be selected for the electrical element, so that a standard IC housing will suffice. In order further to limit the dimensions of the transmit/receive unit designed as a ferrite core with windings, the ferrite core is designated as a cylindrical bar provided with recesses between the ends to take windings. Surprisingly, and contrary to existing expectations, it was found that no short circuiting of lines of flux occurred here, and the ferrite core was found to function in the optimum manner while its diameter decreased.

The invention will be explained in greater detail below with reference to an example of an embodiment shown in the drawing, in which:

FIG. 1 shows a top view in cross section of the transponder according to the invention;

FIG. 2 shows a side view of the transponder according to the invention; and

Figure 3:
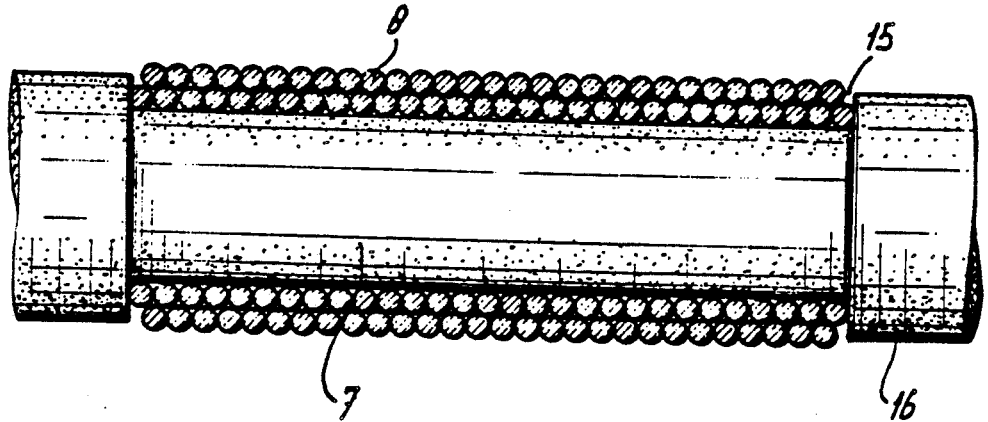
FIG. 3 shows in cross section a detail of the ferrite core shown in the transponder in FIGS. 1 and 2.

FIG. 1 shows a transponder indicated in its entirety by reference number 1. It comprises a plastic tube 2 with bottom 3, shut off at one end by a cap 4. The tube 2 contains an electronic element 5 such as a chip connected by means of connecting wires 6 to both the windings 8 of ferrite core 7 and capacitor 9 (see FIG. 2). At the other side, electronic element 5 is connected to capacitor 10, and a few other wires are free for connection to a programming device. As shown in FIG. 2, the electronic element 5 is supported by a carrier 11. For positioning, aperture 12 are provided in the carrier 11, in which legs 13 of the electronic element 5 are placed. Before the insertion of the ferrite core 7, it is impregnated with wax, together with the windings 8. This is to prevent its action from changing during operation due to moisture absorption through the plastic tube 2.

According to the invention, tube 2 is made of plastic because this ensures better adhesion to the body of the animal. In order to promote this adhesion, tube 2 and cap 4 are also provided with a certain surface roughness. The impregnation agent, wax, is not shown in the drawing. After insertion of the ferrite core and the electronic element 5 and making of all the necessary connections, before the cap 4 is placed, polysiloxane material is inserted under vacuum conditions, in order to protect the whole unit from the effects of moisture. This polysiloxane material is not shown in the drawing. Plastic tube 2 and cap 4 are preferably made by injection molding. On the one hand, this is extremely inexpensive to carry out and, on the other, it is thereby ensured that a sterile product is obtained immediately after the injection moulding. Through placing the electrical element lengthwise after the ferrite core 7, it is possible to make said element fairly large, so that—as can be seen clearly from the figures—a standard chip housing can be used. Such an arrangement is important because during the implantation in an animal, as described in NL-A-8703077, the opening in the skin of the animal must be made as small as possible, following which the length of the part to be implanted is less important, all this in order to prevent infections from injuries and the like as far as possible.

FIG. 3 shows a detail of ferrite core 7. As can be seen, this ferrite core is essentially cylindrical and provided with a recess 15. It was surprisingly found that, despite this recess 15, the functioning of the ferrite core 7 is just as good or even better than in the situation in which the windings 8 lie internally on the part with the largest external diameter indicated by 16. This is contrary to the preconceived ideas existing hitherto. Through the use of a standard chip housing, a free space is provided, in which the capacitors 9 and 10 are housed. Although the invention is described above with reference to a preferred embodiment, it must be understood that many modifications can be made to the transponder which lie within the scope of the present invention.

I claim:

1. A transponder comprising:
   a plastic holder having a hollow interior;
   a transmit/receive unit within the hollow interior of said holder, said transmit/receive unit including a core and coil assembly impregnated with wax;
   an electronic element electrically connected to said transmit/receive unit within the hollow interior of said holder; and wherein the hollow interior of said holder is at least partially filled with a plastic filler material.

2. The transponder as defined in claim 1, wherein said plastic holder is an injection molded piece.

3. The transponder as defined in claim 1, wherein the outer surface of said holder is rough.

4. The transponder as defined in claim 1, wherein said plastic filler material comprises polysiloxane.

5. The transponder as defined in claim 1, wherein said core of said transmit/receive unit comprises a ferrite bar having a recess intermediate the ends thereof for receiving said coil.

6. An implantable transponder comprising,
a plastic holder having a hollow interior and a roughened outer surface;
a transmit/receive unit within the hollow interior of said holder, said transmit/receive unit including a core and coil assembly impregnated with wax; said core comprising a ferrite bar having a recess intermediate the ends thereof for receiving said coil;
an electronic element electrically connected to said transmit/receive unit within the hollow interior of said holder; and
wherein the hollow interior of said holder is at least partially filled with a plastic filler material.

7. The transponder as defined in claim 6, wherein said plastic holder is an injection molded piece.

8. The transponder as defined in claim 6, wherein said plastic filler material comprises polysiloxane.

9. A method of manufacturing a transponder, comprising the steps of:
injection molding a hollow plastic holder having a rough outer surface;
impregnating a transmit/receive unit including a core and coil assembly with wax;
positioning said transmit/receive unit within the hollow interior of said holder;
connecting an electronic element to said transmit/receive unit within the hollow interior of said holder;
at least partially filling the hollow interior of said holder with a plastic filler material; and
sealing said holder.

10. The method of manufacturing a transponder as defined in claim 9, wherein said plastic filler material comprises polysiloxane.

11. The method of manufacturing a transponder as defined in claim 9, wherein said core and coil is manufactured comprising the steps of:
providing a recess in a ferrite bar intermediate the ends of said bar;
winding a coil around the bar within the recessed area thereof; and
impregnating the core and coil in wax.

12. A method of manufacturing a transmit/receive unit for an implantable transponder comprising the steps of:
providing a recess in a ferrite bar intermediate the ends of said bar;
winding a coil around the bar within the recessed area thereof; and
impregnating the bar and coil in wax.

* * * * *